United States Patent
Malwankar et al.

(10) Patent No.: US 9,652,182 B2
(45) Date of Patent: May 16, 2017

(54) SHAREABLE VIRTUAL NON-VOLATILE STORAGE DEVICE FOR A SERVER

(71) Applicant: Pavilion Data Systems, Inc., Sunnyvale, CA (US)

(72) Inventors: Kiron Balkrishna Malwankar, Saratoga, CA (US); Srinivas Prasad Vellanki, Saratoga, CA (US); Hemanth Srinivas Ravi, Saratoga, CA (US)

(73) Assignee: Pavilion Data Systems, Inc., San Jose, CA (US)

( * ) Notice: Subject to any disclaimer, the term of this patent is extended or adjusted under 35 U.S.C. 154(b) by 18 days.

(21) Appl. No.: 13/755,643

(22) Filed: Jan. 31, 2013

(65) Prior Publication Data

US 2013/0198450 A1 Aug. 1, 2013

Related U.S. Application Data

(60) Provisional application No. 61/593,237, filed on Jan. 31, 2012.

(51) Int. Cl.
*G06F 3/06* (2006.01)
*G06F 9/44* (2006.01)

(52) U.S. Cl.
CPC .......... *G06F 3/0689* (2013.01); *G06F 3/0607* (2013.01); *G06F 3/067* (2013.01); *G06F 3/0632* (2013.01); *G06F 9/4411* (2013.01)

(58) Field of Classification Search
CPC ...... G06F 3/0662; G06F 3/067; G06F 3/0655; G06F 3/068; G06F 3/0683; G06F 3/061;
(Continued)

(56) References Cited

U.S. PATENT DOCUMENTS 6,055,603 A 4/2000 Ofer et al.
6,304,942 B1 10/2001 DeKoning
(Continued)

FOREIGN PATENT DOCUMENTS

EP 2309394 4/2011
WO WO2008070174 6/2008
(Continued)

OTHER PUBLICATIONS

Oxford Dictionaries, http://www.oxforddictionaries.com/us/definition/american_english/enumerate.*
http://technet.microsoft.com/en-us/library/cc708298%28v=ws.10%29.aspx.

*Primary Examiner* — Midys Rojas
*Assistant Examiner* — Tracy A Warren
(74) *Attorney, Agent, or Firm* — Lowenstein Sandler LLP

(57) ABSTRACT

Disclosed are a system, a method and/or an apparatus of a shareable virtual non-volatile storage device for a server. In one embodiment, the system includes a server, a storage array, a management processor, and a switching fabric. The storage array includes a storage device coupled with a controller associated with a shared driver to receive a data request from the server at a remote location from the storage array through the switch fabric via a communication link to direct the data request to the storage device coupled with it and transmit data to the server through the switch fabric. A virtual storage device is generated in the server to enable the server to share the shared driver in the storage array with other servers through the switch fabric between the server and the storage array. The server distributes the data across the storage devices through the shared driver.

16 Claims, 12 Drawing Sheets

(58) Field of Classification Search
CPC ...... G06F 3/0614; G06F 3/062; G06F 3/0629; G06F 3/0646; G06F 3/0601
USPC .......... 711/111, 114, 161, 162; 709/213–219
See application file for complete search history.

(56) References Cited

U.S. PATENT DOCUMENTS

| | | | |
|---|---|---|---|
| 6,345,368 | B1 | 2/2002 | Bergsten |
| 6,397,267 | B1 | 5/2002 | Chong, Jr. |
| 6,421,715 | B1 | 7/2002 | Chatterjee et al. |
| 6,425,051 | B1 | 7/2002 | Burton et al. |
| 6,564,295 | B2 | 5/2003 | Okabayashi et al. |
| 6,571,350 | B1 | 5/2003 | Kurokawa et al. |
| 6,640,278 | B1 | 10/2003 | Nolan et al. |
| 6,647,514 | B1 | 11/2003 | Umberger et al. |
| 6,732,104 | B1 | 5/2004 | Weber |
| 6,732,117 | B1 | 5/2004 | Chilton |
| 6,802,064 | B1 | 10/2004 | Yao et al. |
| 6,915,379 | B2 | 7/2005 | Honda et al. |
| 6,965,939 | B2 | 11/2005 | Cuomo et al. |
| 6,988,125 | B2 | 1/2006 | Elnozahy et al. |
| 7,031,928 | B1 | 4/2006 | Cochran |
| 7,035,971 | B1 | 4/2006 | Merchant |
| 7,035,994 | B2 | 4/2006 | Tanaka et al. |
| 7,437,487 | B2 | 10/2008 | Chikamichi |
| 7,484,056 | B2 | 1/2009 | Madnani et al. |
| 7,590,522 | B2 | 9/2009 | Hansen et al. |
| 7,653,832 | B2 | 1/2010 | Faibish et al. |
| 7,743,191 | B1 | 6/2010 | Liao |
| 7,769,928 | B1 | 8/2010 | Tran et al. |
| 7,836,226 | B2 | 11/2010 | Flynn et al. |
| 7,870,317 | B2 | 1/2011 | Suresh |
| 7,958,302 | B2 | 6/2011 | Cherian et al. |
| 8,019,940 | B2 | 9/2011 | Flynn et al. |
| 8,588,228 | B1 | 11/2013 | Onufryk et al. |
| 2001/0013059 | A1 | 8/2001 | Dawson et al. |
| 2002/0035670 | A1 | 3/2002 | Okabayashi et al. |
| 2002/0087751 | A1 | 7/2002 | Chong, Jr. |
| 2002/0144001 | A1 | 10/2002 | Collins et al. |
| 2002/0147886 | A1 | 10/2002 | Yanai et al. |
| 2003/0074492 | A1 | 4/2003 | Cochran |
| 2003/0126327 | A1 | 7/2003 | Pesola et al. |
| 2003/0182504 | A1 | 9/2003 | Nielsen et al. |
| 2004/0010655 | A1 | 1/2004 | Tanaka et al. |
| 2004/0047354 | A1 | 3/2004 | Slater et al. |
| 2004/0088393 | A1 | 5/2004 | Bullen et al. |
| 2005/0039090 | A1* | 2/2005 | Jadon et al. ................. 714/718 |
| 2005/0125426 | A1 | 6/2005 | Minematsu |
| 2005/0154937 | A1 | 7/2005 | Achiwa |
| 2005/0193021 | A1 | 9/2005 | Peleg |
| 2006/0156060 | A1 | 7/2006 | Forrer, Jr. et al. |
| 2006/0265561 | A1 | 11/2006 | Boyd et al. |
| 2007/0038656 | A1 | 2/2007 | Black |
| 2007/0083641 | A1 | 4/2007 | Hu et al. |
| 2007/0168703 | A1 | 7/2007 | Elliott et al. |
| 2007/0233700 | A1 | 10/2007 | Tomonaga |
| 2008/0010647 | A1 | 1/2008 | Chapel et al. |
| 2008/0071999 | A1 | 3/2008 | Boyd et al. |
| 2008/0118065 | A1 | 5/2008 | Blaisdell et al. |
| 2008/0140724 | A1 | 6/2008 | Flynn et al. |
| 2008/0216078 | A1 | 9/2008 | Miura et al. |
| 2009/0019054 | A1 | 1/2009 | Mace et al. |
| 2009/0119452 | A1 | 5/2009 | Bianchi |
| 2009/0150605 | A1 | 6/2009 | Flynn et al. |
| 2009/0177860 | A1 | 7/2009 | Zhu et al. |
| 2009/0248804 | A1 | 10/2009 | Ohtani |
| 2009/0320033 | A1 | 12/2009 | Gokhale et al. |
| 2010/0100660 | A1 | 4/2010 | Tamagawa |
| 2010/0122021 | A1 | 5/2010 | Lee et al. |
| 2010/0122115 | A1 | 5/2010 | Olster |
| 2010/0211737 | A1* | 8/2010 | Flynn .................... G06F 3/0616 711/114 |
| 2010/0223427 | A1 | 9/2010 | Chan et al. |
| 2010/0241726 | A1 | 9/2010 | Wu |
| 2010/0262760 | A1 | 10/2010 | Swing et al. |
| 2010/0262772 | A1 | 10/2010 | Mazina |
| 2011/0022801 | A1 | 1/2011 | Flynn |
| 2011/0035548 | A1 | 2/2011 | Kimmel et al. |
| 2011/0055458 | A1 | 3/2011 | Kuehne |
| 2011/0060882 | A1 | 3/2011 | Efstathopoulous |
| 2011/0060887 | A1 | 3/2011 | Thatcher et al. |
| 2011/0060927 | A1 | 3/2011 | Fillingim et al. |
| 2011/0078496 | A1 | 3/2011 | Jeddeloh |
| 2011/0087833 | A1 | 4/2011 | Jones |
| 2011/0179225 | A1 | 7/2011 | Flynn et al. |
| 2011/0219141 | A1 | 9/2011 | Coile et al. |
| 2011/0219208 | A1 | 9/2011 | Asaad et al. |
| 2011/0289261 | A1* | 11/2011 | Candelaria .................... 711/103 |
| 2011/0289267 | A1 | 11/2011 | Flynn et al. |
| 2011/0296133 | A1 | 12/2011 | Flynn et al. |
| 2011/0296277 | A1 | 12/2011 | Flynn et al. |
| 2011/0314182 | A1* | 12/2011 | Muppirala .............. G06F 13/00 710/5 |
| 2012/0011340 | A1 | 1/2012 | Flynn et al. |
| 2012/0102291 | A1* | 4/2012 | Cherian ................ G06F 9/5044 711/170 |

FOREIGN PATENT DOCUMENTS

| | | |
|---|---|---|
| WO | WO2010117929 | 10/2010 |
| WO | WO2011019596 | 2/2011 |
| WO | WO2011031903 | 3/2011 |
| WO | 2011106394 A2 | 9/2011 |

* cited by examiner

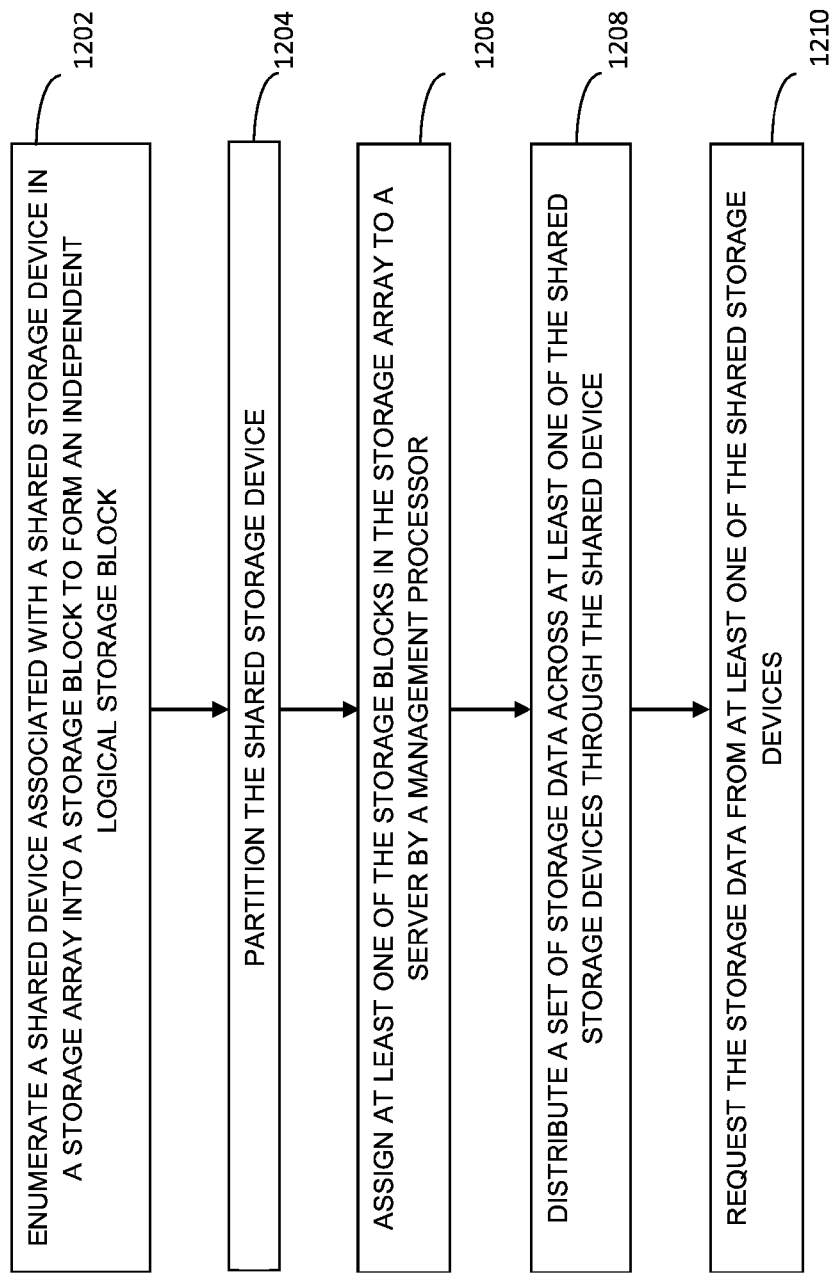

SHAREABLE VIRTUAL NON-VOLATILE STORAGE DEVICE FOR A SERVER

CLAIM OF PRIORITY

This application is a non-provisional application claiming priority to U.S. Provisional Patent Application Ser. No. 61/593,237 titled: "SHAREABLE VIRTUAL NON-VOLATILE STORAGE DEVICE FOR A SERVER," filed on Jan. 31, 2012.

FIELD OF TECHNOLOGY

This disclosure relates generally to the field of data storage and in particular to sharable virtual data storage for a server.

BACKGROUND

A network-attached storage is a system that provides data access between servers and storage devices through a computer network. Network-attached shared storage topology may include a processor, a server machine, a storage array, and communication links (such as PCI express). The interfaces in the topology are used as cache storage rather than primary storage. Nonetheless, the performance of the interfaces in a network attached storage topology is limited due to the latency of the system.

For example, the number of IO's that a processor can handle may be limited by the computing power of the processor and then the processor may become a bottleneck that prevents an exploitation of the advantages associated with a higher performance storage device, such as a solid state memory. Second, the cache storage is not hot-pluggable since it is installed inside of a server and therefore reduces the serviceability of the system. Moreover, the system lacks of data storage security and reliability because the topology is non-redundant (e.g. if the storage associated with a server crashed, it is difficult to extract data from the failed array to recover the data that the server has stored). In addition, it is prohibitively expensive if an organization wants to build a network-attached storage system, which requires implementation of cache storage in a server (e.g. it usually costs approximately $30,000 for a 1 TB PCIe card.)

SUMMARY

In one aspect, a method of processing a data request through a communication link from a server received by a shared device in a storage array which is at a remote location from the storage array. The method may include routing the data request between the server and the shared device present in the storage array.

Another illustrative aspect may include generating a virtual storage device in the server to enable the server to share a shared storage device in the storage array with other servers by means of a switching fabric between the server and the storage array.

The method may include routing storage data between the shared storage device and a set of data buffers in the server through the communication link when the storage data is accessed from the storage array using the virtual storage device.

The method may further include storing a set of mapping information for the virtual storage device as a mapping table in a management processor that is at a remote location from the server, deriving the locations on access for the virtual storage device algorithmically.

In yet another aspect, enumerating the shared device associated with the shared storage device in the storage array into a storage block to form an independent logical storage block, partitioning the shared storage device. The method may include assigning at least one of the storage blocks in the storage array to the server by the management processor.

The method may include distributing the storage data across at least one of the shared storage devices through the shared device. The method may further include requesting data from at least one of the shared storage devices.

The methods and systems disclosed herein may be implemented by any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

DESCRIPTION OF THE DIAGRAMS

Example embodiments are illustrated by way of example and not limitation in the figures of the accompanying drawings, in which like references indicate similar elements and in which:

FIG. 11 is a flow diagram of a method of distributing a set of storage data across at least one of a plurality of shared storage devices, according to one or more embodiments.

Other features of the present embodiments will be apparent from the accompanying drawings and from the disclosure of the various embodiments.

DETAILED DESCRIPTION

Several methods and a system for a shareable virtual non-volatile storage device for a server are disclosed. In the following description, for the purposes of explanation, numerous specific details are set forth in order to provide a thorough understanding of the various embodiments. Although the present embodiments have been described with reference to specific example embodiments, it will be evident that various modifications and changes may be made to these embodiments without departing from the broader spirit and scope of the various embodiments.

According to one embodiment disclosed herein, a set of shared drivers associated with a plurality of shared storage devices is centralized in a storage array and coupled with a number of servers which do not have any locally stored physical drives. In such a manner, the server may share the shared driver with other servers through a virtualized storage device located in the server. A processor (e.g. CPU in the storage array, management CPU, etc.) may assign one of the shared storage devices or multiple shared storage devices to at least one of the given servers. The processor may expose necessary information to both of the shared storage device and the server so that the server can communicate with the shared storage device directly without going through a physical drive.

Figure 1A:
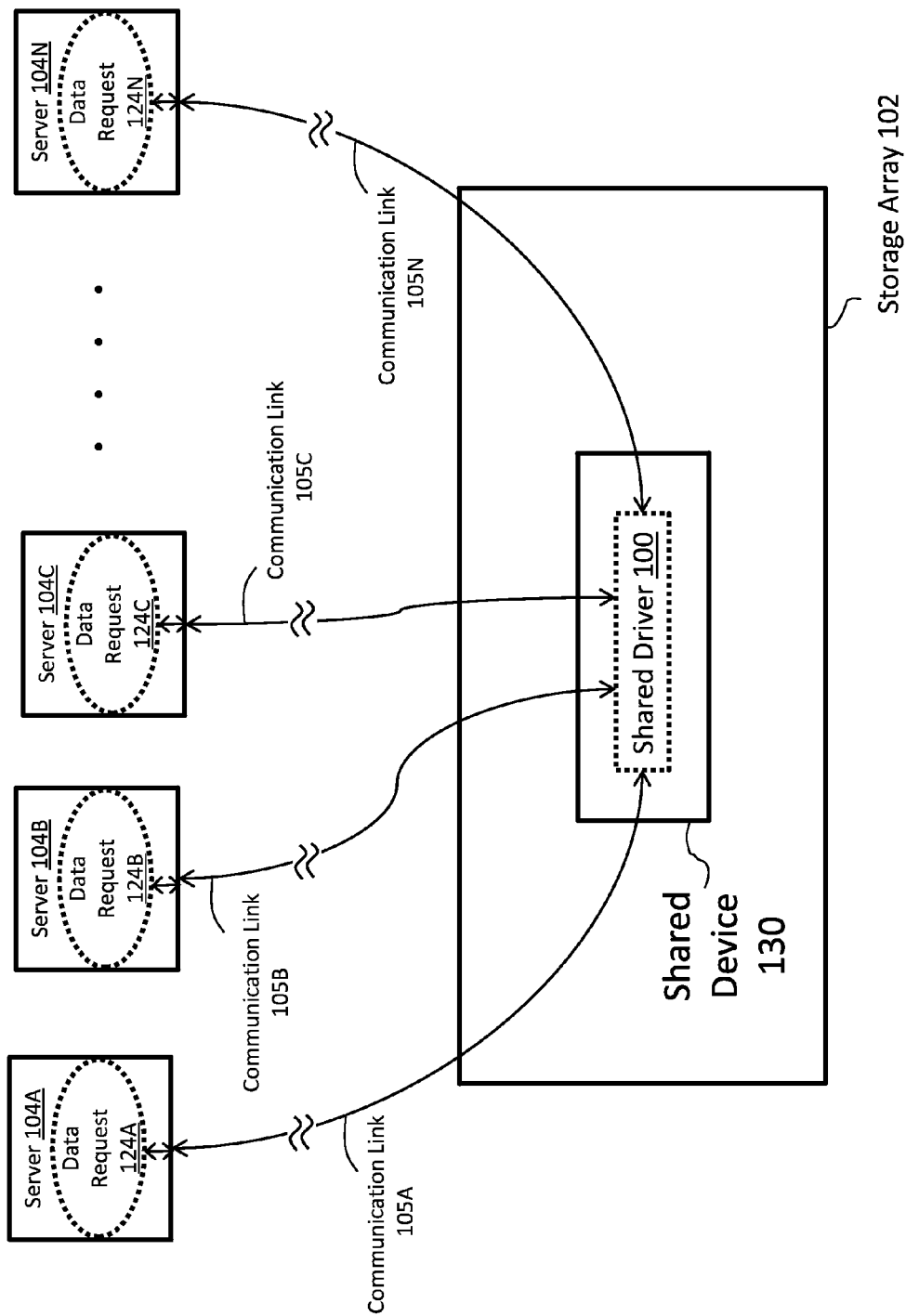
FIG. 1A is a network view of a number of servers coupled with shared drivers in a storage array through communication links, according to one or more embodiments.

FIG. 1A indicates a number of Servers 104A-N and one or a set of Shared Drivers 100 implemented for a Shared Device 130 in a Storage Array 102. According to one or more embodiments, each of the Servers 104A-N may be coupled with Shared Drivers 100 via Communication Links 105A-N and the Servers 104A-N may be located at a remote location from the Storage Array 102. A Data Request 124 may be routed from the Servers 104A-N to the Shared Drivers 100 through the Communication Links 105A-N.

In one embodiment, the Servers 104A-N may be data processing devices. In one embodiment, the data processing device may be a hardware device that includes a processor, a memory (not shown in FIG. 1A) and/or server hard drives (not shown in FIG. 1A.) In one embodiment, the data processing device (e.g. Server 104A) may be a physical computer. In one embodiment, the data processing device may be a mobile and/or stationary (desktop computer) device. In another embodiment, the Servers 104A-N may be software disposed on a non-transient computer readable medium. The software may include instructions which when executed through a processor may perform requested services. In one embodiment, the Servers 104A-N may be application servers, home servers, communication servers, catalog servers, name servers, database servers, etc. The Servers 104A-N may be further described in FIG. 3. In one embodiment, the Communication Links 105A-N may include cables (e.g. PCIe cables), network switches, I/O ports and/or network bridges. In one embodiment, the Communication Links 105A-N may be PCIe (Peripheral Component Interconnect Express), PCI/PCI-X, and/or AGP (Accelerated Graphics Ports) bus standard communication links. In one embodiment, the Communication Links 105A-N may correspond to the NVMe (Non-Volatile Memory express) or SCSIe (Small Computer System Interface express) communication protocols, etc. In one embodiment, the Storage Array 102 may be a storage system that includes a number of storage devices, drivers, controllers and/or I/O ports. In one embodiment, the Storage Array 102 may include Shared Drivers 100. The Shared Drivers 100 may be a translator between the Servers 104A-N and the storage devices associated with the Storage Array 102. In one embodiment, the Storage Array 102 may have an advanced functionality such as RAID (Redundant Array of Independent Disks) and virtualization. The Storage Array 102 may be further described in FIG. 1B.

The Servers 104A-N may communicate with the Shared Drivers through the Communication Links 105A-N, according to one or more embodiments. In another embodiment, the Servers 104A-N may bypass a processor of the Server 104 when they access the Shared Drivers 100 in the Storage array 102 and route the Data Request 124 between the Server 104 and the Shared Drivers 100 in the Storage Array 102. In one embodiment, the Shared Drivers 100 in the Storage Array 102 may receive the Data Request 124 from a Server (e.g., Server 104A) that is at a remote location from the Storage Array 102 through a Communication Link (e.g., Communication Link 105A). In another embodiment, a Server (e.g., Server 104A) may receive a Storage Data 426 from the Shared Driver 100 in the Storage Array 102 and the Server (e.g., Server 104A) may send Storage Data to the Shared Driver 100 in the Storage Array 102.

Figure 1B:
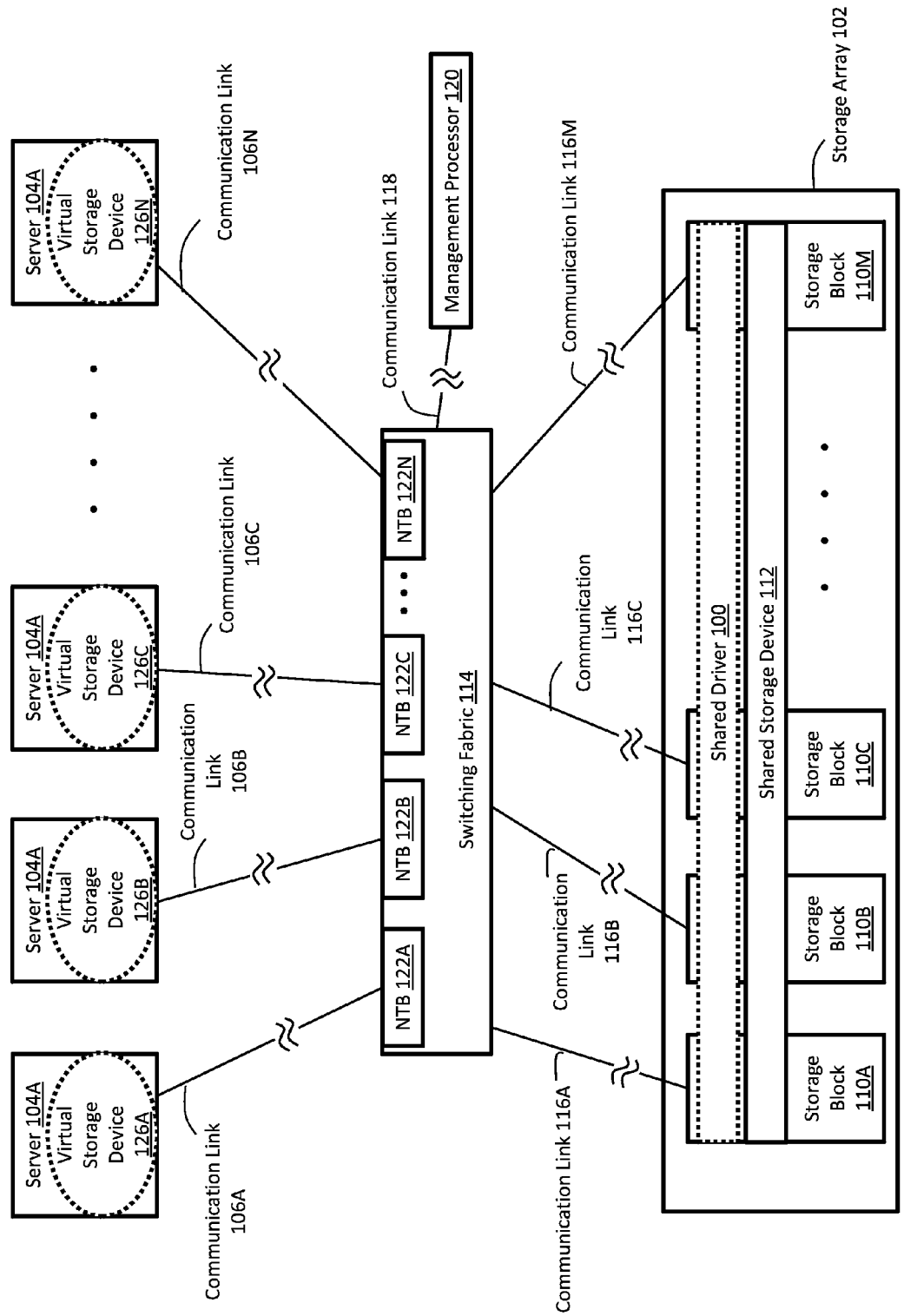
FIG. 1B is a schematic view of a number of servers coupled with storage blocks in a storage array through communication links and switching fabric that is controlled by a management processor, according to one or more embodiments.

FIG. 1B indicates a Switching Fabric 114 associated with a set of NTBs (Non-Transparent Bridges) 122, a Management Processor 120, the Servers 104A-N, Virtual Storage Devices 126A-N in the Servers 104A-N, and/or one or a set of Shared Storage Devices 112 associated with the Shared Driver 100 in a number of Storage Blocks 110A-M located at the Storage Array 102. In one embodiment, the Virtual Storage Devices 126A-N may be generated in the Servers 104A-N to enable the Servers 104A-N to share the Shared Storage Device 112 in the Storage Array 102 with other servers through the Switch Fabric 114 between the Servers 104A-N and the Storage Array 102. In particular, the Management Processor 120 is coupled with the Switching Fabric 114 via a Communication Link 118. The Management Processor 120 may be, but is not limited to, a Management CPU. The Management Processor 120 may be further described in FIG. 4. The Storage Blocks 110A-N may be coupled with the Switching Fabric 114 via the Communication Links 116A-M. In one embodiment, the Storage Blocks 110A-M may include the Shared Storage Device 112, the Shared Driver 100, a controller (not shown in FIG. 1B) and/or an I/O port (not shown in FIG. 1B). The Storage Blocks 110A-M may be aggregated to form a logical storage block device. The Storage Blocks 110A-M may be further described in FIG. 2.

In one embodiment, the Switching Fabric 114 may be one or more network switches. In one embodiment, the network switch may be a PCIe switch and/or a fibre channel switch, etc. In one embodiment, the Switching Fabric 114 may include the NTBs 122A-N to isolate each of the Servers 104A-N from the Switching Fabric 114 and the Management Processor 120. Although the NTBs 122A-N are not necessary, they provide clock isolation and also isolate the Servers 104A-N so that the Servers 104A-N can keep functioning when any of the Communication Links 106A-N get disconnected. Some or all of the NTBs 122A-N may be replaced with a transparent bridge, source route bridging, etc. In one embodiment, the Communication Links 116A-M and Communication Link 118 may be in accordance with the PCIe, PCI/PCI-X and/or AGP bus standard. In one embodiment, the Communication Links 116A-M and the Communication Link 118 may be NVMe or SCSIe communication protocols, etc. In another embodiment, the Communication Links 116A-M and the Communication Link 118 may include cables (e.g. PCIe cables), network switches, I/O ports and/or network bridges.

Figure 2:
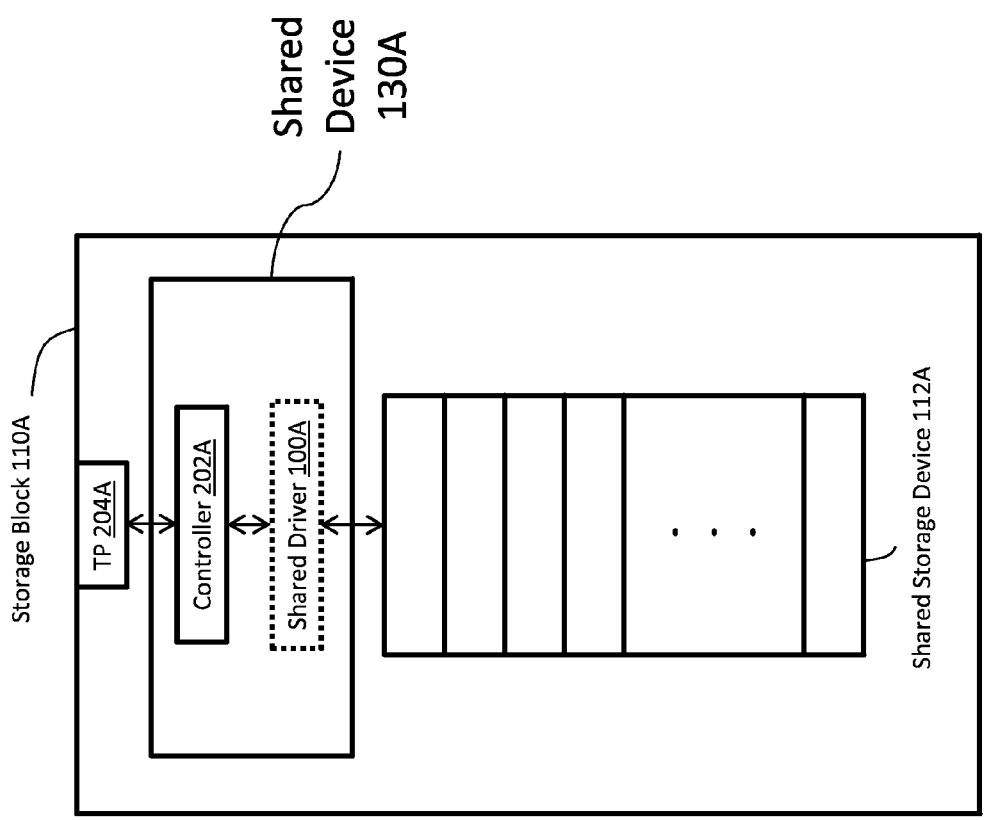
FIG. 2 is an exploded view of the storage block in FIG. 1B, according to one or more embodiments.

FIG. 2 illustrates an exploded view of the Storage Block 110A of FIG. 1B, according to one or more embodiments. In particular, FIG. 2 illustrates that the Storage Block 110A may include the Shared Storage Device 112A, the Shared Driver 100A implemented for the Shared Device 130A, a Controller 202A in the Shared Device 130A and/or a TP (Transparent Port) 204A. The TP 204A may be replaced by a non-transparent port, a network bridge, etc. In one embodiment, the Shared Storage Device 112A may be a SSD (Solid-State Device.) In one embodiment, the Shared Storage Device 112A may be a PCIe based solid state storage device. In one embodiment, the Shared Storage Device 112A may be an NVMe (non-volatile memory express) storage device. In one embodiment, the Shared Storage Device 112A may be a PCIe disk of a 2.5" form-factor and operates based on the NVMe protocol. PCIe may be a computer expansion card standard. The PCIe SSDs may be storage devices designed based on the PCIe standard. SSD form factor specification may define the electrical and/or mechanical standard for a PCIe connection to the existing standard 2.5" disk drive form factor. An NVMe standard may define a scalable host controller interface designed to utilize PCIe based SSDs.

In one embodiment, the Shared Driver 100A for the Controller 202A associated with the Shared Storage Device 112A may be enumerated into the Storage Block 110A to form an independent logical storage block. In one embodiment, the Controller 202A may be registered to the logical mapping of the Storage Block 110A by the Management Processor 120. In one embodiment, the Controller 202A may perform a read/write operation transferring the Storage Data 426 between the Storage Block 110A and the Servers 104A-N. In one embodiment, the Controller 202A may receive a read/write descriptor setup from the Server 104. In one embodiment, the Shared Storage Device 112A may read by transferring the Storage Data 426 from one or more of the Servers 104A-N based on the mapping information of the Storage Device 112A and the read/write descriptor from the one or more of the Servers 104A-N received by the Controller 202A. In one embodiment, the Shared Storage Device 112A may write by transferring the Storage Data 426 through the Controller 202A to one or more of the Servers 104A-N based on the mapping information of the Storage Device 112A and the read/write descriptor from the one or more of the Servers 104A-N.

Figure 3:
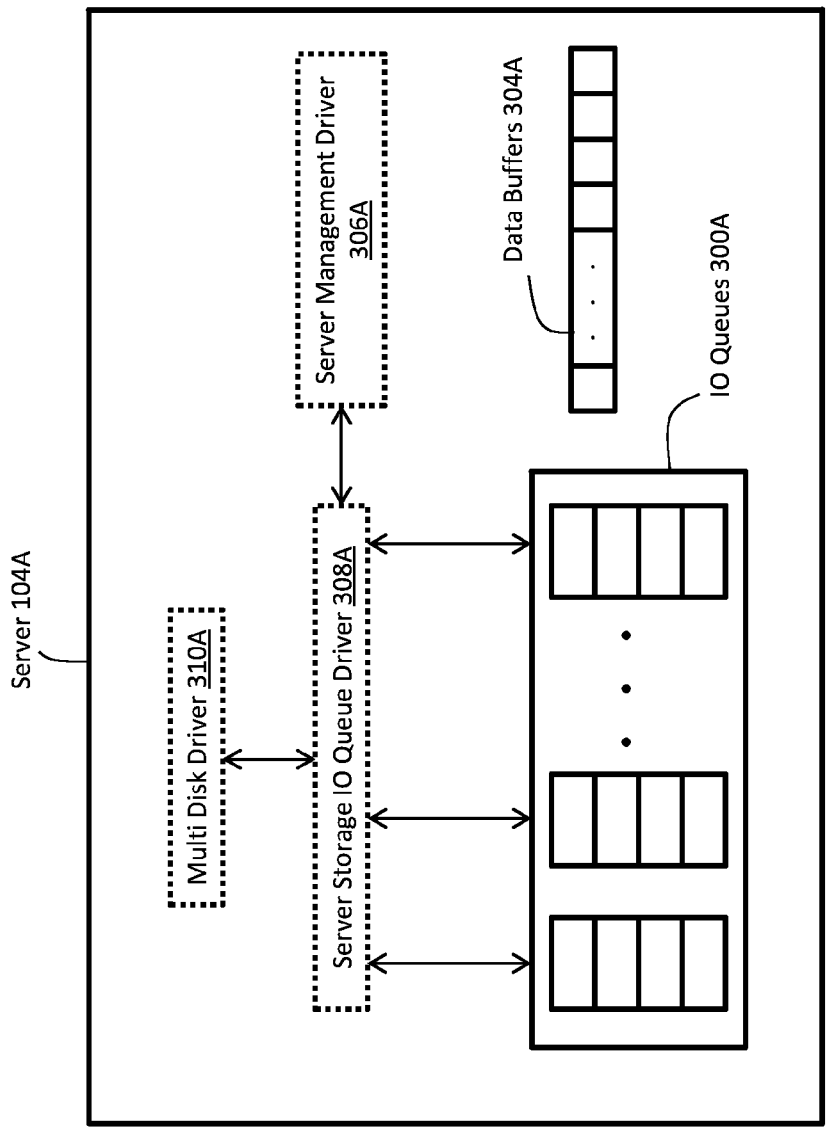
FIG. 3 illustrates an exploded view of the server in FIG. 1B, according to one or more embodiments.

FIG. 3 illustrates an exploded view of one of the Servers 104A-N (e.g. Server 104A) of FIG. 1A, FIG. 1B, according to one or more embodiments. In particular, FIG. 3 illustrates a set of IO Queues 300A, a set of Data Buffers 304A, a Server Management Driver 306A, a Server Storage IO Queue Driver 308A and/or a Multi Disk Driver 310A. In one embodiment, the IO Queues 300A may be NVMe IO queues. In one embodiment, the Data Buffers 304A may receive the Storage Data 426 from the Storage Array 102 through the controller 202. In another embodiment, the Data Buffers 304A may transfer the Storage Data 426 to the Storage Array 102 through the controller 202. In one embodiment, the Server Management Driver 306A may receive a set of logical driver information of the Shared Driver 100 from the Management Processor 120. In one embodiment, the Server Management Driver 306A may algorithmically derive the mapping of logical drive information based on an ID of the Server 104A assigned by the Management Processor 102. In one embodiment, the Server Storage IO Queue Driver 308A may be a server NMVe Driver. In one embodiment, the Server Storage IO Queue Driver 308A may write to the Controller 202 to indicate the read/write descriptor setup in the IO Queues 300A. In one embodiment, the Server Storage IO Queue Driver 308A may communicate to the Server Management Driver 306A to maintain the logical mapping for registers of one or more of the Storage Blocks 110A-M for each of the Controllers 202 with the Multi Disk Driver 310A. The Multi Disk Driver 310A may be a separate module or a functionally separated module within the Server Storage IO Queue Driver 308A. At this stage the Multi Disk Driver 310A may register the one or more Storage Blocks 110A-M with the Server 104A and may be available for transferring the Storage Data 426 input/output to the Shared Storage Device 112. Multi Disk Driver 310A may issue a read/write IO request to the Server Storage IO Queue Driver 308A. The Server Storage IO Queue Driver 308A may map the IO operation to one of the IO Queues 300A based on the mapping of the Shared Storage Device 112 and may set up the read/write descriptor in the mapped IO Queues 300A at the next available location in the IO Queues 300A.

Figure 4:
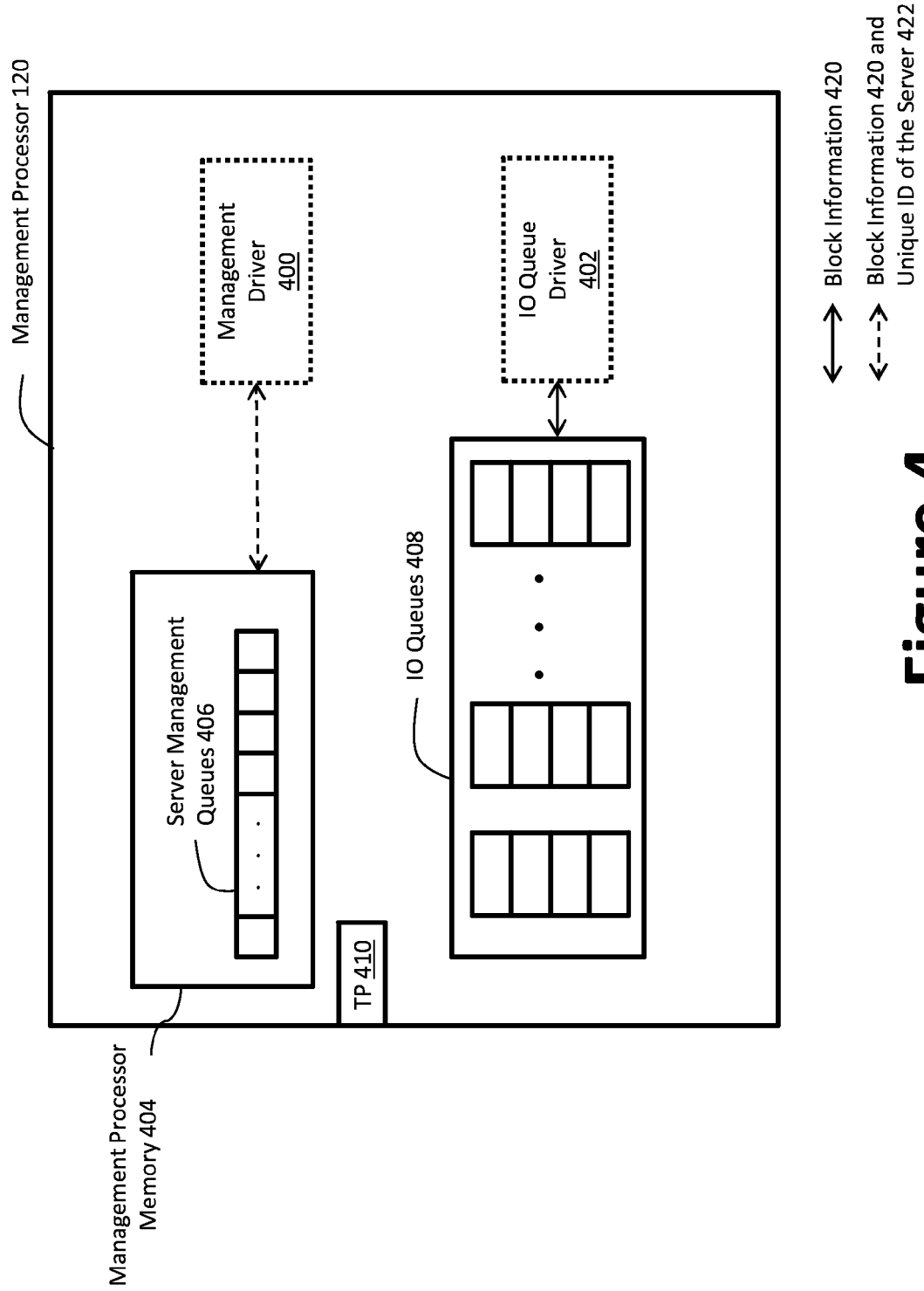
FIG. 4 is an exploded view of the management processor in FIG. 1B, according to one or more embodiments.

FIG. 4 illustrates an exploded view of the Management processor 120 of FIG. 1B, according to one or more embodiments. In particular, FIG. 4 illustrates a Management Driver 400, an IO Queue Driver 402, a set of Server Management Queues 406 implemented in a Management Processor Memory 404, a set of IO Queues 408 and/or a TP 410. In one embodiment, the Management processor 120 may be, but is not limited to, a management CPU. In one embodiment, the Management processor 120 may enumerate the Controllers 202 and may partition the Shared Storage Devices 112A-112M, the Shared Drivers 100A-100M, the Controllers 202A-202M, and/or the TPs 204A-204M into the Storage Blocks 110A-110M, respectively. The Management processor 120 may map one or more of the Storage Blocks 110A-M to a Block information 420, which may include a controller ID and/or an IO Submission/Completion Queue ID that is stored in the Management processor 120. In one embodiment, the Management Driver 400 may initialize registers for the Server 104 and control the communication between the Server 104 and the Management processor 120 by using the Server Management Queue 406 implemented in the Management Processor Memory 404. In one embodiment, the Management Driver 400 may send the Block Information 420 and a unique ID of the server 422 to the Server Management Driver 306 in the Server 104. In one embodiment, the IO Queue Driver 402 may be an NVMe driver. In one embodiment, the IO Queues 408 may be NVMe admin queues. In another embodiment, TP 410 may be replaced by non-transparent port, network bridges, etc.

Figure 5:
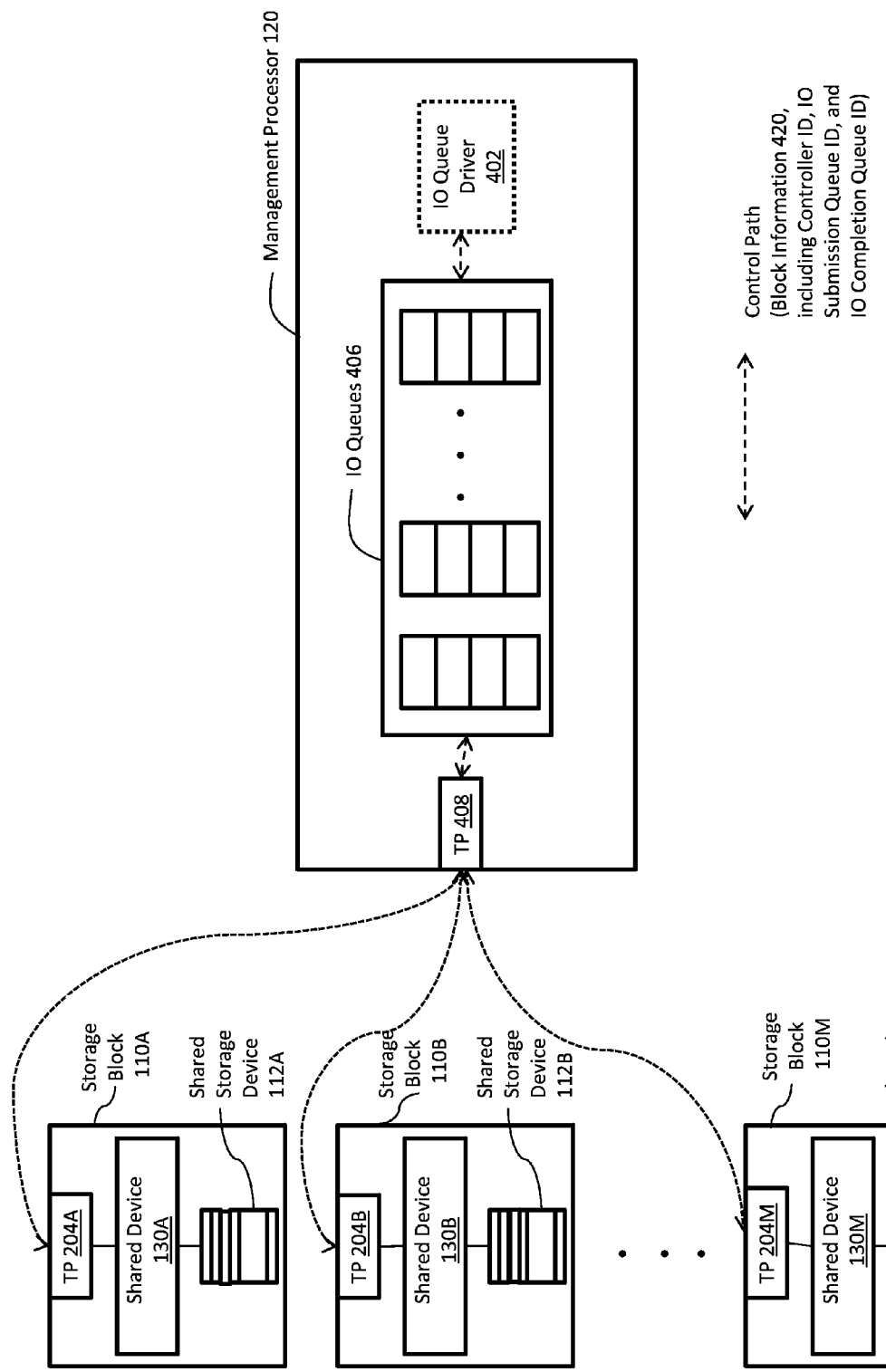
FIG. 5 shows a control path in the system domain, according to one or more embodiments.

FIG. 5 shows that when the Management processor 120 powers up, it may enumerate the Shared Device 130 and may partition the Shared Storage Devices 112A-112M, the Shared Drivers 100A-100M implemented for the Shared Device 130, the Controllers 202A-202M in the Shared Device 130, and/or the TPs 204A-204M into the Storage Blocks 110A-110M, respectively and may assign the Block Information 420 to the Shared Device 130. The Storage Blocks 110A-M may be aggregated to form a logical storage block device. There may be a mapping of Storage Blocks 110A-M to the Block Information 420. In one embodiment, the Management Processor 120 may derive the Block Information 420 algorithmically based on the unique ID of the server 422. In one embodiment the Block Information 420 may include a controller ID, an IO submission queue ID, and/or an IO completion queue ID.

Figure 6:
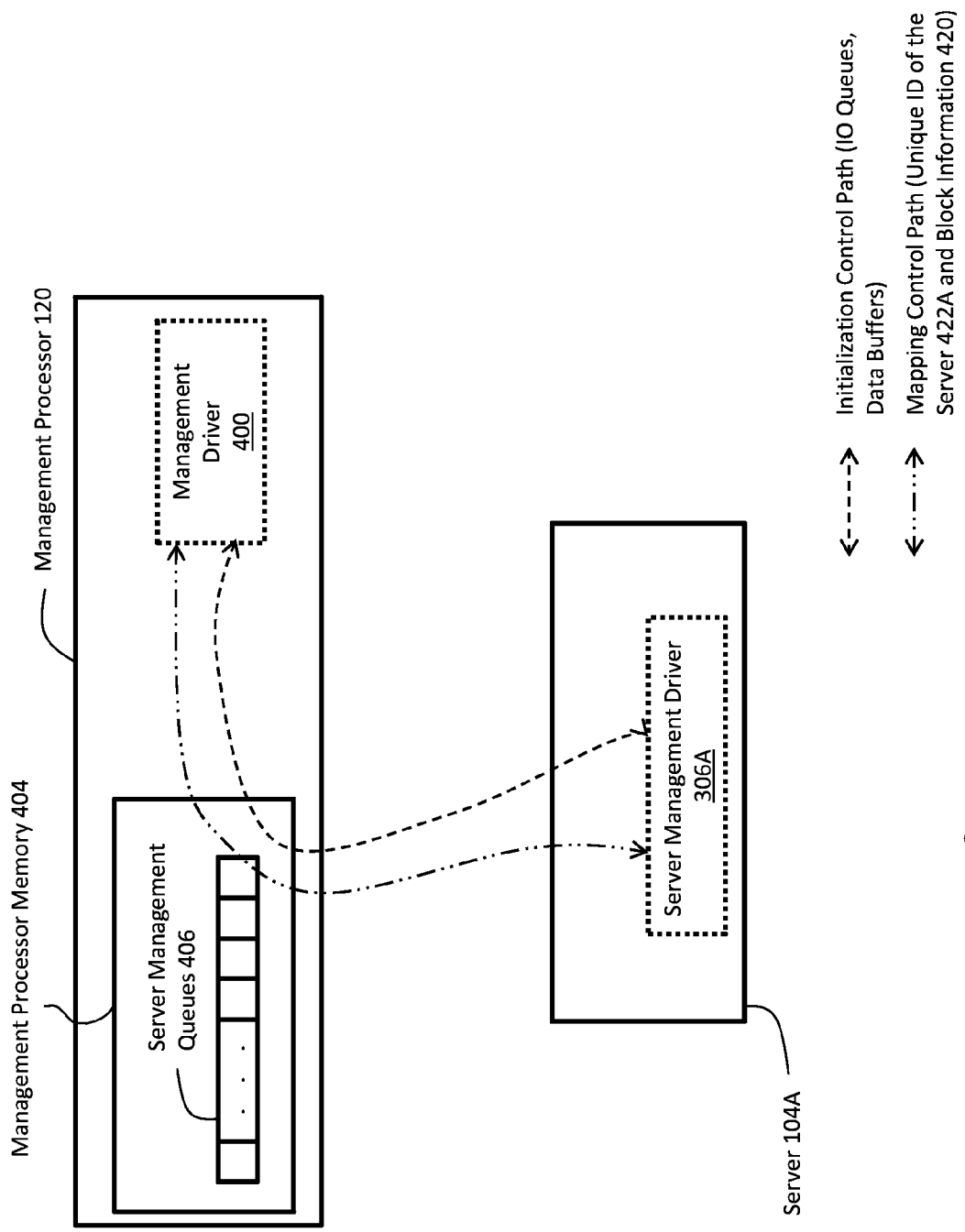
FIG. 6 shows a control path between the management processor in system domain and the server, according to one or more embodiments.

FIG. 6 shows that when any of the Servers 104A-N (e.g. Server 104A) powers up, the Server 104A may be undergoing initialization and may register with the Management Driver 400 in the Management processor 120. The communication between the Server 104A and the Management processor 120 may be done by using the Server Management Queues 406 implemented in the Management Processor Memory 408. The Server Management Driver 306A may send the information of the IO Queues 300A and the Data Buffers 304A to the Management Driver 400 through the Server Management Queues 406. The Management Driver 400 may send the Block Information 420 to the Server Management Driver 306A in the Server 104A. Alternately, the Block Information 420 can be algorithmically derived by the Server Management Driver 306A based on the Unique ID of the Server 422A. In such a matter, the Server 104A may be assigned a unique ID of the Server 422A.

Figure 7:
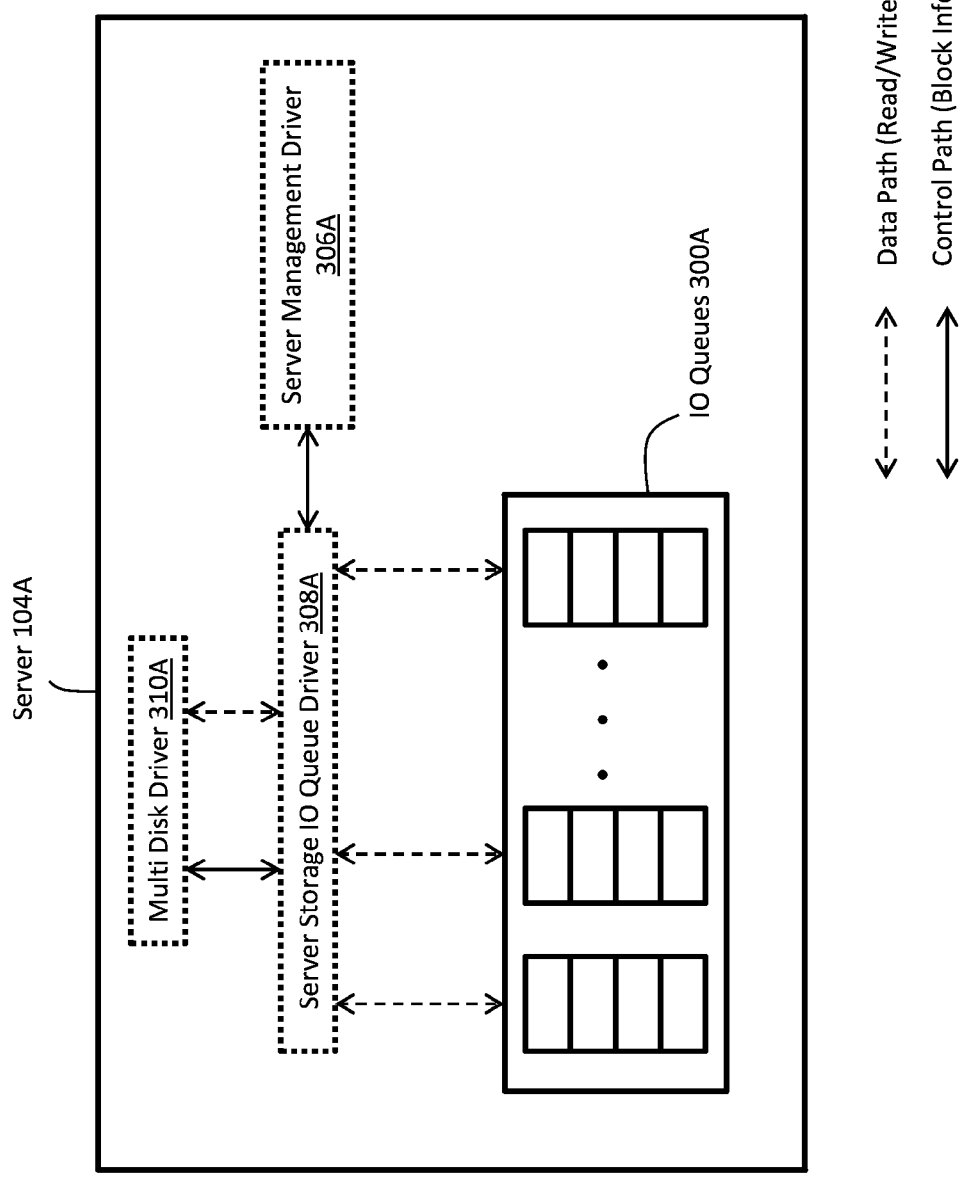
FIG. 7 illustrates a control path and a data path in the server, according to one or more embodiments.

FIG. 7 shows that the Block Information 420 from the Management Processor 120 in one or more of the Servers 104A-N (e.g. Server 104A) may be communicated to the Server Storage IO Queue Driver 308A by the Server Management Driver 306A. The Server Storage IO Queue Driver 308A may maintain the Block Information 420 for the Storage Block 110 with the Multi Disk Driver 310A. The Multi Disk Driver 310A may be a separate module or a functionally separated module within the Server Storage IO Queue Driver 308A. At this stage the Multi Disk Driver 310A may register one or more of the Storage Blocks 110A-N with the Server 104A and may be available for transferring the Storage Data 426 to the Shared Storage Device 112 and receiving the Storage Data 426 from the Shared Storage Device 112. The Multi Disk Driver 310A may issue a Read/Write IO Request 424 to the Server Storage IO Queue Driver 308A. The Server Storage IO Queue Driver 308A may map the Read/Write IO Request 424 to one of the IO Queues 300A based on the mapping of the Shared Storage Device 112 and may set up the Read/Write IO Request 424 in the mapped IO Queues 300A at the next available location in the IO Queues 300A.

Figure 8:
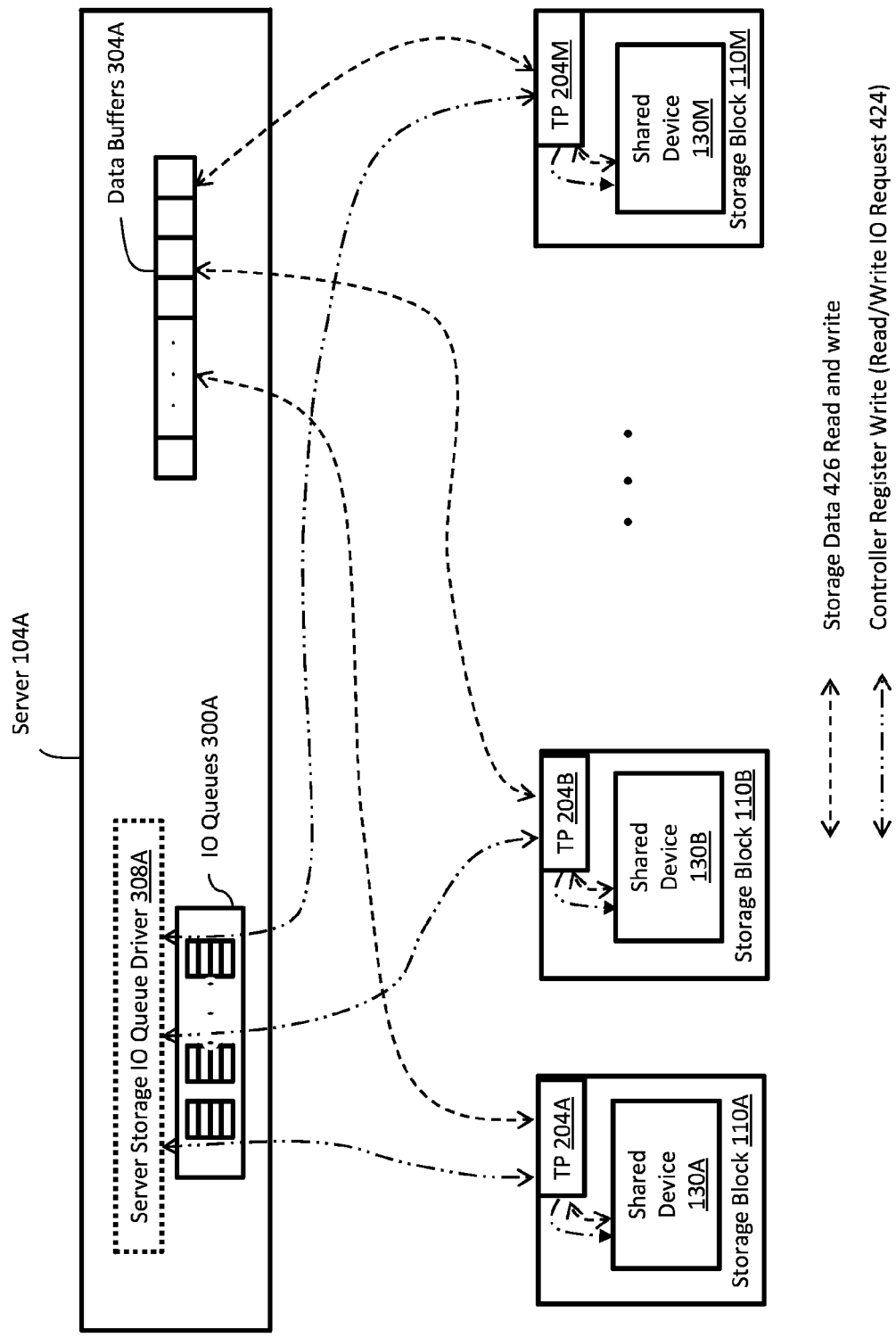
FIG. 8 illustrates a write data path and a read data path between the server and the storage blocks, according to one or more embodiments.

FIG. 8 shows that in one or more of the Servers 104A-N (e.g. Server 104A), the Server Storage IO Queue Driver 308A may write to the Shared Device 130 to indicate the Read/Write IO Request 424 from the IO Queues 300A. The Shared Device 130 may perform the read/write operation based on the Read/Write IO Request 424 transferring the Storage Data 426 between the Storage Blocks 110A-N and the Data Buffers 304A in the Server 104A. In particular, the Storage Data 426 may be transferred from the Storage Blocks 110A-N to the Data Buffers 304A for a read operation. In particular, the Storage Data 426 may be transferred from the Data Buffers 304A to the Storage Blocks 110A-N for a write operation.

Figure 9:
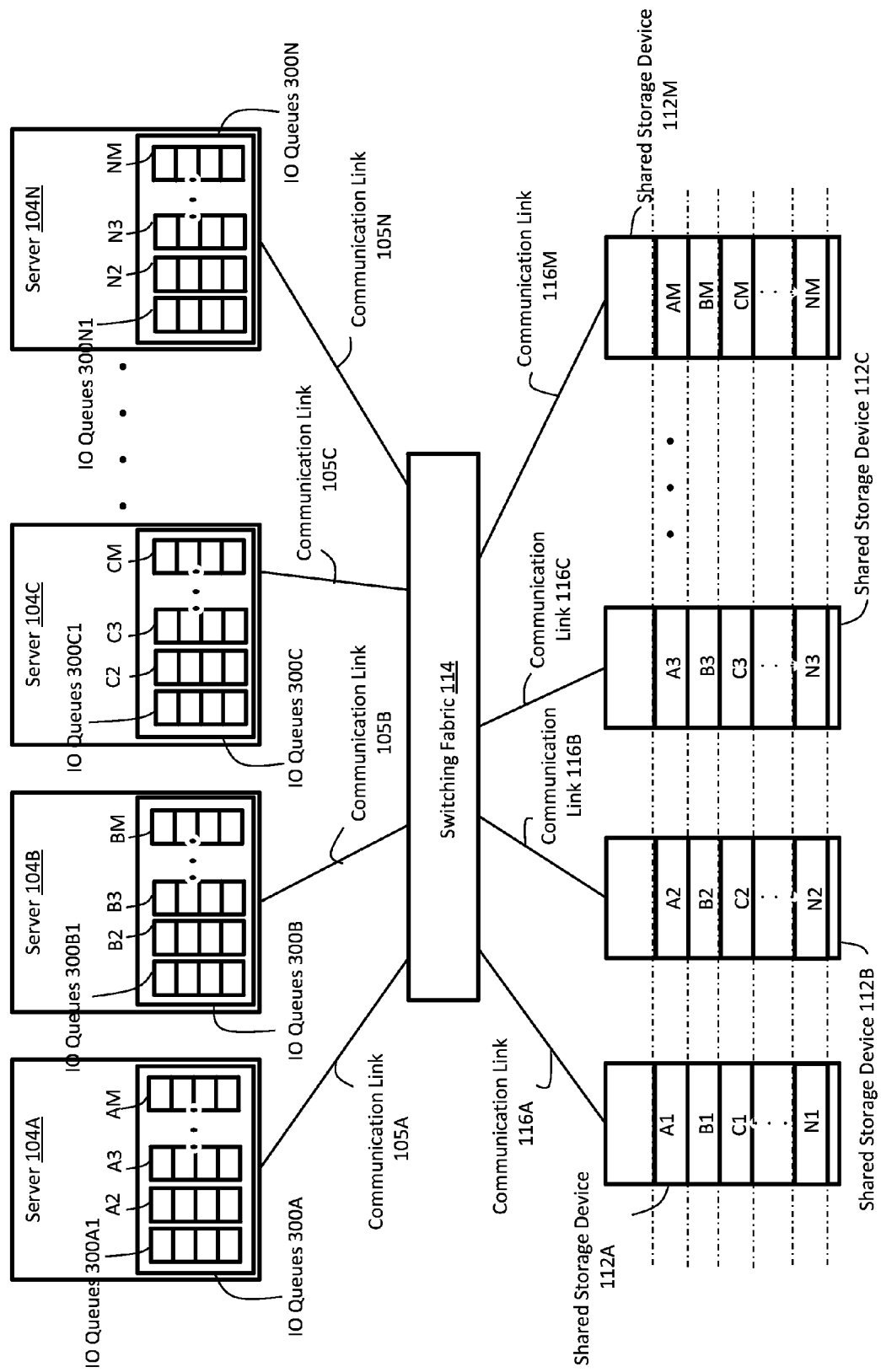
FIG. 9 is a system block diagram showing the queues, according to one or more embodiments.

FIG. 9 indicates the Server 104A to the Server 104N are coupled with the Shared Storage Device 112A to Shared Storage Device 112M through the Switch Fabric 114 via Communication Link 105A to Communication Link 105N and Communication Link 116A to Communication Link 116M. In one embodiment, the IO Queues 300A-N may be located in the Servers 104A-N, respectively. In one embodiment, the Shared Storage Devices 112A-M may be striped across the devices. In particular, the IO Queues 300A1 (A1) may be stored in the Shared Storage Device 112A, the IO Queues 300A2 (A2) may be stored in the Shared Storage Device 112B, the IO Queues 300A3 (A3) may be stored in the Shared Storage Device 112C, and so on. In particular, the IO Queues 300AM (AM) may be stored in the Shared Storage Device 112M. In another embodiment, the IO Queues 300B1 (B1) may be stored in the Shared Storage Device 112A, the IO Queues 300B2 (B2) may be stored in the Shared Storage Device 112B, the IO Queues 300B3 (B3) may be stored in the Shared Storage Device 112C, and so on. In particular, the IO Queues 300BM (BM) may be stored in the Shared Storage Device 112M. In another embodiment, the IO Queues 300C1 (C1) may be stored in the Shared Storage Device 112A, the IO Queues 300C2 (C2) may be stored in the Shared Storage Device 112B, the IO Queues 300C3 (C3) may be stored in the Shared Storage Device 112C, and so on. In particular, the IO Queues 300CM (CM) may be stored in the Shared Storage Device 112M. In one embodiment, the IO Queues 300N1 (N1) may be stored in the Shared Storage Device 112A, the IO Queues 300N2 (N2) may be stored in the Shared Storage Device 112B, the IO Queues 300N3 (N3) may be stored in the Shared Storage Device 112C, and so on. In particular, the IO Queues 300NM (NM) may be stored in the Shared Storage Device 112M. The Server 104 may write the Storage Data 426 across the Shared Storage Device 112A-112M through the Shared Driver 100. Alternately, the Server 104 may send the Storage Data 426 to the Storage Array 102 and may read the Storage Data 426 from the Shared Storage Device 112A-112M.

Figure 10:
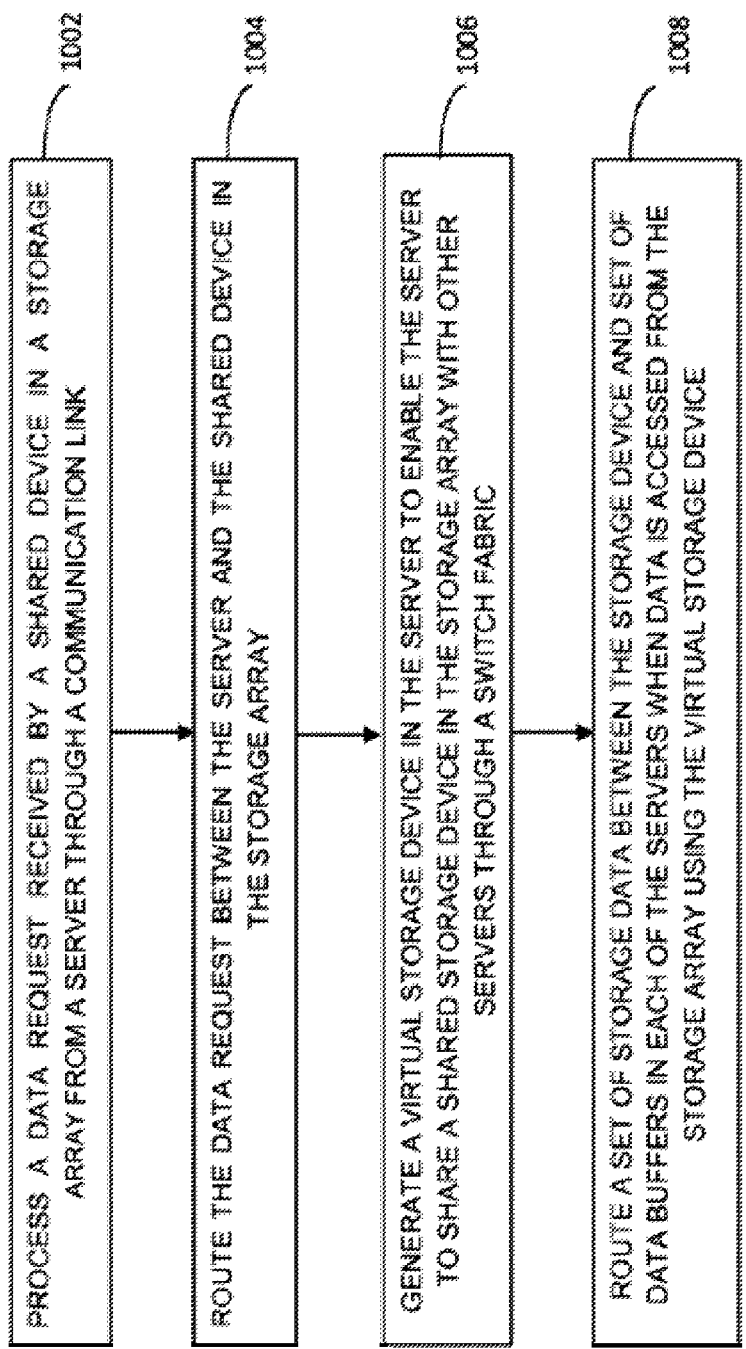
FIG. 10 is a flow diagram of data request processing and routing the data between the server and the shared device, according to one or more embodiments.

FIG. 10 is a flow diagram of the Data Request 124 processing and routing the Storage Data 426 between the server 104 and the Shared Device 130 according to one or more embodiments. In operation 1002, the Data Request 124 may be processed. The data request may be received by the Shared Device 130 in the Storage Array 102 from the Server 104A, which may be at a remote location from the Storage Array 102, through the Communication Link 105A. In operation 1004, the Data Request 124 may be routed between the Server 104A and the Shared Device 130 in the Storage Array 102 according to one embodiment.

In operation 1006, the Virtual Storage Device 126 may be generated in the Servers 104A-N to enable the Servers 104A-N to share the Storage Device 112 in the Storage Array 102 with other servers through the Switching Fabric 114 between the Servers 104A-N and the Storage Array 102. In operation 1008, the Storage Data 426 may be routed between the Storage Device 112 in the Storage Array 102 and a set of Data Buffers 304 in each of the Servers 104A-N through the Communication Links 105A-N when the Storage Data 426 is accessed from the Storage Array 102 using the Virtual Storage Devices 126A-N.

FIG. 11 is a flow diagram of a method of enumerating the Shared Device 130 associated with the Shared Storage Device 112 in the Storage Array 102. In operation 1202, the Shared Device 130 may be enumerated, which may be associated with the Shared Storage Device 112 in the Storage Array 102 into the Storage Block 110 to form an independent logical storage block. In operation 1204, the Shared Storage Device 112 may be partitioned. In operation 1206, one of the Storage Blocks 110 in the Storage Array 102 may be assigned to the Server 104A by the Management Processor 120. In operation 1208, the Storage Data 426 may be distributed across one of the Shared Storage Devices 112 through the Shared Device 130. In operation 1210, the Storage Data 426 may be requested from one of the Shared Storage Devices 112.

Although the present embodiments has been described with reference to specific example embodiments, it will be evident that various modifications and changes may be made to these embodiments without departing from the broader spirit and scope of the various embodiments. For example, the various devices, modules, analyzers, generators, etc. described herein may be enabled and operated using hardware circuitry (e.g., CMOS based logic circuitry), firmware, software and/or any combination of hardware, firmware, and/or software (e.g., embodied in a machine readable medium).

For example, each of the Servers 104A-N may be a PC, the Shared Storage Device 112 may be a SSD, the Management Processor 120 may be a management CPU, the Communication Links 106A-N, 116A-M, and 118 may be PCIe buses and the Switching Fabric 114 may be a PCIe switching fabric. The system may consist of multiple PCs, multiple SSDs and a management CPU interconnected via a PCIe switching fabric. The management CPU and SSDs may be connected to the PCIe switching fabric via PCIe transparent ports. The PCs may be connected to the PCIe switching fabric via PCIe non-transparent ports. The resources in the System domain such as the Controller registers and the Server Mgmt Queue are mapped across the NTB into the Server domain. The management CPU may enumerate the SSD controllers and partitions the SSDs into blocks. Blocks from multiple SSDs may be aggregated to form a logical SSD block device. The mapping of the logical block devices to set of Controller ID, IO Queue ID and storage blocks is stored in persistent storage by the management CPU. The PCs during initialization may register with the management driver in the management CPU. The communication between the PCs and the management CPU may be done using the server management Queue implemented in the management CPU memory. The management driver may send the logical SSD block device information to the server management driver in the PCs. The logical block device information includes the Controller ID, the IO submission/completion queue ID on the Controller and the storage block information for each of the SSDs that are included in the logical block device. Alternately this mapping of logical drive to a set of Controller IDs, IO Queue IDs and storage blocks can be algorithmically derived by the server management driver based on the ID of the PCs. In this scheme each PCs in the system will be assigned a unique ID.

The logical driver information may be communicated to the server NVMe driver in the PC by the server management driver in the PC. The server NVMe driver may maintain the logical mapping for registers to a logical disk for each of the SSD controllers with the multi disk driver in the PC. The multi disk driver can be a separate module or a functionally separated module within the server NVMe driver. At this stage the multi disk driver may register the logical disk with the PC operation system and is available for data input and output to the SSDs.

The multi disk driver may issue an read/write IO request to the server NVMe driver. The server NMVe driver may map the IO operation to one of more NVMe IO queues based on the mapping of the logical drive and sets up the read/write descriptor in the mapped NVMe IO queues at the next available location in the NVMe IO queue. The server NVMe driver may write to the controller register to indicate the new read/write descriptors setup in the NVMe IO queue. The controllers may perform the read/write operation transferring data between the SSD and the data buffers in the PC. For a read operation data may be transferred from the SSD to the data buffers in the PCs. For a write operation data may be transferred from the data buffers to the SSD.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A method of a server computing device comprising:
   receiving, by the server computing device, a server identifier (ID) from a management processor of a remote storage array comprising the management processor, a plurality of controllers, and a plurality of solid state storage devices, wherein the server ID identifies the server computing device to the remote storage array;
   algorithmically determining, by the server computing device based on the server ID, a controller ID for a controller of the plurality of controllers in the remote storage array, wherein the controller having the controller ID is to perform read operations and write operations to transfer data between the server computing device and the remote storage array;
   algorithmically determining, by the server computing device based on the server ID, an input/output (IO) queue ID for an IO queue to be used for reading data from the remote storage array and writing data to the remote storage array;
   registering, by a driver executing on the server computing device, the server computing device to one or more storage blocks of the remote storage array;
   generating, by the driver, a virtual storage device on the server computing device;
   maintaining a logical mapping of the one or more storage blocks for the virtual storage device;
   receiving a write request to write first data to the virtual storage device; and
   transferring at least a portion of the first data from one or more data buffers of the server computing device through the controller to a shared solid state storage device of the plurality of solid state storage devices in the remote storage array without writing the first data to any internal physical drive of the server computing device, the transferring comprising:
      mapping the write request to the IO queue, having the IO queue ID, that is maintained at the server computing device based on the logical mapping of the one or more storage blocks;
      adding an entry for the write request to the IO queue at a next available location in the IO queue; and
      notifying the controller of the entry for the write request in the IO queue.

2. The method of claim 1, wherein the server computing device lacks an internal physical drive.

3. The method of claim 1, further comprising:
   receiving a read request to read second data from the virtual storage device; and
   accessing the one or more storage blocks in the remote storage array, the accessing comprising:
      sending a read request for the second data at the one or more storage blocks to the controller; and
      receiving, from the controller, the second data at the one or more data buffers of the server computing device, the data having been retrieved from the one or more storage blocks.

4. The method of claim 3, further comprising:
   bypassing one or more processors when accessing the one or more storage blocks in the remote storage array.

5. The method of claim 1, further comprising:
   registering the server computing device with the management processor of the remote storage array.

6. The method of claim 1, further comprising:
   initializing, by a management driver executing on the server computing device, one or more registers for the server computing device;
   registering the server computing device with the management processor; and
   communicating with the management processor of the remote storage array using a server management queue.

7. The method of claim 1, further comprising:
responsive to the write request, transferring, to each of the plurality of solid state storage devices, a portion of the first data from the one or more data buffers of the server computing device.

8. A non-transitory computer readable medium having instructions that, when executed by a computing device, cause the computing device to perform operations comprising:
receiving, by the computing device, a controller identifier (ID) from a management processor via a server management queue of the management processor, wherein the management processor is a component of a remote storage array comprising the management processor, a plurality of controllers, and a plurality of solid state storage devices (SSDs), wherein the controller ID identifies a controller of the plurality of controllers in the remote storage array, and wherein the controller having the controller ID is to perform read operations and write operations to transfer data between the server computing device and the remote storage array;
receiving, from the management processor via the server management queue of the management processor, an input/output (IO) queue ID for an IO queue to be used for reading data from the remote storage array and writing data to the remote storage array;
registering, by a driver executing on the computing device, the computing device to one or more storage blocks of the remote storage array;
generating, by the driver, a virtual storage device on the computing device;
maintaining a logical mapping of the one or more storage blocks for the virtual storage device;
receiving a write request to write first data to the virtual storage device; and
transferring at least a portion of the first data from one or more data buffers of the computing device through the controller to a shared solid state storage device of the plurality of solid state storage devices in the storage array without writing the first data to any internal physical drive of the server computing device, the transferring comprising:
mapping the write request to the IO queue, having the IO queue ID, that is maintained at the computing device based on the logical mapping of the one or more storage blocks;
adding an entry for the write request to the IO queue at a next available location in the IO queue; and
notifying the controller of the entry for the write request in the IO queue.

9. The non-transitory computer readable medium of claim 8, the operations further comprising:
receiving a read request to read second data from the virtual storage device; and
accessing the one or more storage blocks in the remote storage array, the accessing comprising:
sending a read request for the second data at the one or more storage blocks to the controller; and
receiving, from the controller, the second data at the one or more data buffers of the server computing device, the data having been retrieved from the one or more storage blocks.

10. The non-transitory computer readable medium of claim 8, the operations further comprising:
registering the computing device with the management processor of the remote storage array.

11. The non-transitory computer readable medium of claim 8, the operations further comprising:
initializing, by a management driver executing on the computing device, one or more registers for the computing device; and
registering the computing device with the management processor of the remote storage array.

12. The non-transitory computer readable medium of claim 8, the operations further comprising:
responsive to the write request, transferring, to each of the plurality of solid state storage devices, a portion of the first data from the one or more data buffers of the computing device.

13. A server computing device comprising:
one or more data buffers; and
a processor coupled to the one or more buffers, wherein the processor is to:
receive a server identifier (ID) from a management processor of a remote storage array comprising the management processor, a plurality of controllers, and a plurality of solid state storage devices, wherein the server ID identifies the server computing device to the remote storage array;
algorithmically determine, based on the server ID, a controller ID for a controller of the plurality of controllers in the remote storage array, wherein the controller having the controller ID is to perform read operations and write operations to transfer data between the server computing device and the remote storage array;
algorithmically determine, based on the server ID, an input/output (IO) queue ID for an IO queue to be used for reading data from the remote storage array and writing data to the remote storage array;
register the server computing device to one or more storage blocks of the remote storage array;
generate a virtual storage device on the server computing device;
maintain a logical mapping of the one or more storage blocks for the virtual storage device;
receive a write request to write first data to the virtual storage device; and
transfer at least a portion of the first data from the one or more data buffers through the controller to a shared solid state storage device of the plurality of solid state storage devices in the storage array without writing the first data to any internal physical drive of the server computing device, wherein to transfer the portion of the first data the processor is to:
map the write request to the IO queue, having the IO queue ID, that is maintained at the server computing device based on the logical mapping of the one or more storage blocks;
add an entry for the write request to the IO queue at a next available location in the IO queue; and
notify the controller of the entry for the write request in the IO queue.

14. The server computing device of claim 13, wherein the server computing device lacks an internal physical drive.

15. The server computing device of claim 13, wherein the processor if further to:
receive a read request to read second data from the virtual storage device; and
access the one or more storage blocks in the remote storage array, the accessing comprising:

sending a read request for the second data at the one or more storage blocks to the controller; and receiving, from the controller, the second data at the one or more data buffers of the server computing device, the data having been retrieved from the one or more storage blocks.

16. The server computing device of claim 13, wherein the processor is further to:

responsive to the write request, transfer, to each of the plurality of solid state storage devices, a portion of the first data from the one or more data buffers of the server computing device.

\* \* \* \* \*